(12) United States Patent
Inoue et al.

(10) Patent No.: US 6,456,388 B1
(45) Date of Patent: Sep. 24, 2002

(54) PRINTER ENCLOSING NETWORK COMPUTER AND COMPUTER NETWORK SYSTEM EMPLOYING THE SAME

(75) Inventors: Chizu Inoue, Funabashi; Kazushi Yamamoto, Uda-gun; Takashi Imai, Nara, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,671

(22) Filed: Jul. 31, 1998

(30) Foreign Application Priority Data

Aug. 1, 1997 (JP) .............................. 9-208199

(51) Int. Cl.[7] .......................... G06F 13/00; G06F 3/12; G06K 15/02
(52) U.S. Cl. ................ 358/1.15; 358/1.13; 358/1.14
(58) Field of Search .................... 358/1.15, 1.14, 358/1.13, 1.9

(56) References Cited

U.S. PATENT DOCUMENTS

| | | | |
|---|---|---|---|
| 5,537,626 A | | 7/1996 | Kraslavsky et al. ......... 395/828 |
| 5,795,082 A | * | 8/1998 | Shimada et al. ....... 400/120.09 |
| 6,003,065 A | * | 12/1999 | Yan et al. .................... 709/201 |
| 6,011,905 A | * | 1/2000 | Huttenlocher et al. ...... 395/102 |
| 6,018,774 A | * | 1/2000 | Mayle et al. ................ 709/250 |

FOREIGN PATENT DOCUMENTS

| | | | |
|---|---|---|---|
| EP | 0 653 700 A1 | 10/1994 | ............. G06F/3/12 |
| EP | 0 653 700 A1 | 5/1995 | ............. G06F/3/12 |
| JP | 01-204132 | 8/1989 | ............. G06F/3/12 |
| JP | 07-129343 | 5/1995 | ............. G06F/3/12 |
| JP | 123635/1996 | 5/1996 | ............. G06F/3/12 |
| JP | 09-188010 | 7/1997 | .............. B41J/5/30 |
| WO | WO95/33247 | 12/1995 | ........... G06T/11/20 |

OTHER PUBLICATIONS

Vision for Java Applications; Improve Competency to Sophisticate Great Talent, An Article in Nikkei Open Systems by Akio Hoshi, Issue 48, pp 273–276, Nikkei BP Publishing Mar. 15, 1997.

Japanese Patent Application No. 09–540930, Filed May 14, 1997, [PCT (WO) 2000–510267) Published Aug. 8, 2000].

* cited by examiner

Primary Examiner—Joseph Mancuso
Assistant Examiner—Douglas Tran
(74) Attorney, Agent, or Firm—Edwards & Angell, LLP; David G. Conlin; William J. Delay, Jr.

(57) ABSTRACT

A subject data file to be printed out and an application corresponding to the subject data file are downloaded from a computer network to an application download type printer enclosing a network computer. Then, the application is started up on the network computer, whereby the subject data file is opened, converted to a raster image, and printed out.

19 Claims, 13 Drawing Sheets

PRINTER ENCLOSING NETWORK COMPUTER AND COMPUTER NETWORK SYSTEM EMPLOYING THE SAME

FIELD OF THE INVENTION

The present invention relates to a data transmission method between a computer and a printer in a computer network system.

BACKGROUND OF THE INVENTION

In a conventional computer network system, when a data file on a particular application is outputted to a printer connected to a computer network in response to the user's manipulation of a client computer, data are sent/received in the following manner. In the first place, the application is started up on the client computer to open a subject data file to be printed out. Then, a pre-installed printer driver for the printer is retrieved from the client computer at a print command issued by the application. Then, the subject data file is converted to a command exclusively used for the printer by the printer driver. Finally, the converted data file is sent to the printer and printed out.

In case of a bitmap method mostly adopted by inexpensive printers, the data file opened by the application may be converted to adequate bitmap data on the client computer in response to the resolution of the printer before it is sent to the printer.

On the other hand, in case that the data are sent in the page-description language represented by PostScript, a function for converting the subject data file to the page-description language is provided to the computer, so that the printer interprets and converts the page-description language to the bitmap data and prints out the same.

However, according to the above data sending methods, the client computer has to run a series of jobs, such as starting up the application, opening the subject data file, issuing a print command, and converting the data by means of the printer driver. Thus, the CPU (Central Processing Unit) of the client computer is almost fully occupied while these jobs are run, thereby affecting the other jobs also run by the client computer. In addition, in case of an application of a large size, the client computer takes a while to finish these jobs, thereby reducing the user's workability.

Also, in case of the bitmap data sending method adopted by inexpensive printers, a large volume of data are transmitted. Thus, a traffic volume in the computer network is increased, and the sending/receiving of the other data throughout the computer network is affected.

In case of the data sending method in the page-description language, the page-description language must be pre-installed in the client computer, while a function for interpreting the page-description language must be provided to the printer. Thus, the printer also demands a high-speed CPU, a memory and a hard disk, and consequently, becomes very expensive. Further, in case that complicated data are printed out, quite a heavy burden is applied on the client computer and the CPU in the printer while the data are converted to the page-description language. Thus, there may be some cases where the printing speed drops below the rated printing speed.

Moreover, each type of printer demands their respective printer drivers in accordance with their specifications. Thus, the user has to install a specific print driver for the user's printer into the client computer. In case that various types of printers are connected to the network and shared in the network system, the user has to manipulate the client computer in different manners depending on which printer the user is going to use, and this manipulation is quite a burden on the user. Also, the user has to manage the version of each printer driver, which adds up a burden on the user.

Furthermore, since the printer driver is developed for each type of printer in accordance with their respective specifications, the development demands considerable time and money.

SUMMARY OF THE INVENTION

It is therefore an object of the present invention to provide a printer enclosing a network computer and employed on a computer network, which can reduce a burden on a client computer that issues a print command and a traffic volume in the computer network during a printing job.

To fulfill the above and other objects, a printer of the present invention, enclosing a network computer and employed on a computer network, is characterized in that the network computer is furnished with:

a network control section for downloading a subject data file to be printed out and an application corresponding to the subject data file from the computer network; and an image converting section for starting up the application and converting the subject data file into a raster image.

According to the above arrangement, the subject data file and application corresponding to the subject data file are sent to the printer enclosing the network computer as the data for the printing job. Generally, a volume of the subject data file and application is smaller than a volume of the conventional bitmap data. Thus, according to the above arrangement, a traffic volume in the computer network can be reduced.

The job of converting the subject data file to a raster image using the application corresponding to the subject data file is carried out by the image converting section included in the printer enclosing the network computer on the application downloaded by the network control section. In other words, it is no longer necessary to provide a printer driver to the client computer or the like that issues a print command to enable the same to carry out the above converting job.

Thus, not only the costs can be reduced by saving the time and money for developing the printer driver, but also a burden on the user, such as management of the version of each printer driver, can be reduced. In addition, since a capacity of a hard disk or a memory necessary to store the printer driver and the like can be reduced, the client computer can be downsized and less expensive. Further, there is an advantage that, when the user enters a print command, the user no longer has to select an adequate printer driver for the printer the user is going to use.

In a conventionally known printing system, the client computer is furnished with a function for converting the data file to the page-description language and the printer is furnished with a function for interpreting the page-description language. In this conventional system, the printer has to maintain and manage the application necessary for interpreting the page-description language.

In contrast, the present invention is arranged in such a manner that the network control section downloads an application necessary for converting the subject data file to a raster image from the computer network. Thus, according to the arrangement of the present invention, the printer enclosing the network computer has to neither maintain nor manage the above application.

Further, since it is the image converting section provided in the printer enclosing the network computer that carries out the above converting job, the client computer only has to issue a print command to the printer enclosing the network computer. Thus, the client computer can carry out other jobs once it has issued the print command, thereby improving its operation efficiency.

Also, a computer network system of the present invention is a computer network system, wherein a printer enclosing a network computer is connected to a plurality of apparatuses including a computer, and characterized in that the network computer enclosed in the printer is furnished with:

a network control section for downloading a subject data file to be printed out and an application corresponding to the subject data file from any of said plurality of apparatuses on the computer network system; and an image converting section for starting up the application and converting the subject data file into a raster image.

According to the above arrangement, the subject data file to be printed out and the application necessary for converting the subject data file to a raster image are sent to the printer enclosing the network computer as the data for the printing job. Generally, the subject data file and application are smaller in size compared with the conventional bitmap data. Consequently, it has become possible to provide a computer network system, in which an increase in a traffic volume during the printing job can be suppressed.

Also, it is the image converting section provided in the printer that carries out the job of converting the subject data file to a raster image on the application downloaded by the network control section. In other words, it is no longer necessary to provide a printer driver or the like to the client computer or the like that issues a print command. Thus, not only the costs can be reduced by saving the time and money for developing the printer driver, but also a burden on the user, such as management of the version of each printer driver, can be reduced. In addition, the client computer can be downsized and less expensive by reducing capacities of the hard disk and memory for storing the printer driver and the like. Consequently, it has become possible to provide an inexpensive computer network system. Further, when the user enters a print command, the user no longer has to select an adequate printer driver for the printer the user is going to use for the printing job. Thus, there can be attained an advantage that a computer network system with excellent operability can be provided.

Also, compared with a conventional system, in which the client computer is furnished with a function for converting the data file into the page-description language and the printer is furnished with a function for interpreting the page-description language, the above arrangement allows the network control section to download an application necessary for converting the subject data file to be printed out to a raster image from any of the apparatuses (such as the client computer and application server) on the computer network system. Thus, the printer has to neither maintain nor manage the application necessary for converting the subject data file to a raster image.

Further, since the converting job is carried out in the printer, the client computer or the like that issues a print command to the printer can carry out other jobs once it has issued the print command. Consequently, not only a burden on the client computer can be reduced, but also the operation efficiency of the client computer, and hence an overall operation efficiency of the computer network system can be improved.

Also, a printing method of the present invention is a printing method carried out by a printer connected to a computer network, and characterized by being composed of the steps of:

downloading a subject data file to be printed out and an application corresponding to the subject data file from the computer network; and staring up the application downloaded and converting the subject data file to a raster image.

According to the above method, the subject data file and an application necessary for converting the subject data file to a raster image are sent to the printer as the data for the printing job. The subject data file and application are smaller in size compared with the conventional bitmap data. Consequently, an increase in a traffic volume in the computer network during the printing job can be suppressed.

Also, it is the printer connected to the computer network that carries out the job of converting the subject data file to a raster image. In other words, it is no longer necessary to provide a printer driver or the like to the client computer or the like that issues a print command. Thus, not only the costs can be reduced by saving the time and money for developing the printer driver, but also a burden on the user, such as management of the version of each printer driver, can be reduced.

In addition, since the printer driver can be omitted, the client computer can be downsized and less expensive by reducing capacities of the hard disk and memory for storing the printer driver and the like. Further, when the user enters a print command, the user no longer has to select an adequate printer driver for the printer the user is going to use for the printing job, thereby reducing a burden on the user when the user manipulates the client computer.

In a conventionally known printing method, the client computer converts the data file into the page-description language and the printer interprets the page-description language and carries out the printing job. Thus, in the above conventional printing method, both the client computer and printer have to maintain and manage the page-description language. In contrast, in the above method, the network computer downloads an application necessary for converting the subject data file to be printed out to a raster image from any of the apparatuses (such as the client computer and application server) on the computer network system. Thus, the printer has to neither maintain nor manage the application necessary for converting the subject data file to a raster image.

Further, since the above converting job is carried out in the printer, the client computer or the like that issues a print command to the printer can carry out other jobs once it has issued the print command. Consequently, not only a burden on the client computer can be reduced, but also its operation efficiency can be improved.

Furthermore, a program to direct a computer to carry out the above printing method of the present invention can be recorded into a computer-readable recording medium.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIGS. 1 through 4, the following description will describe an example embodiment of the present invention.

Figure 2:
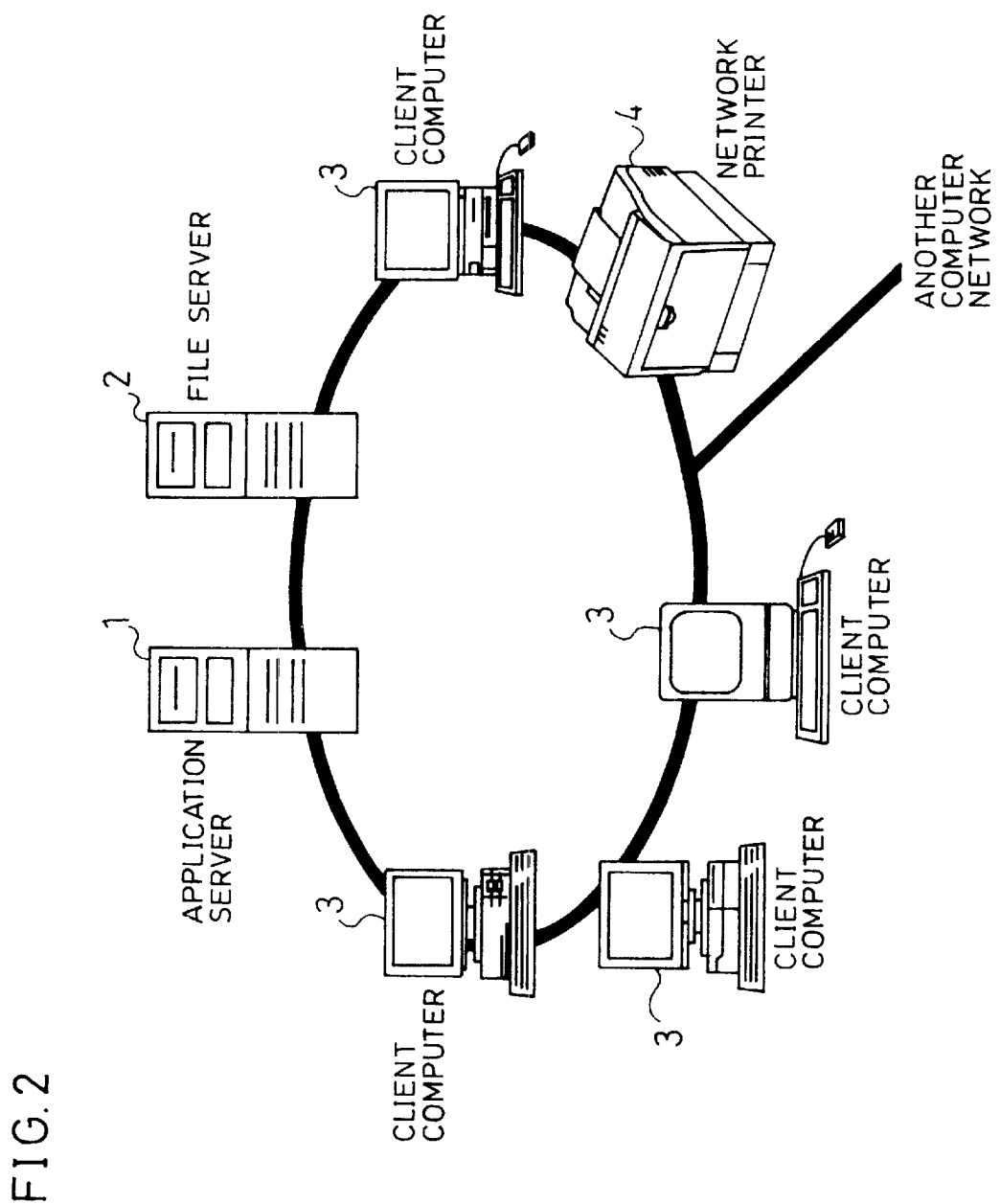
FIG. 2 is a view schematically explaining a arrangement of a computer network constructed by a typical client server system in accordance with the example embodiment.

FIG. 2 is a view schematically explaining an arrangement of a computer network constructed by a typical client server system in accordance with an example embodiment of the present invention. The computer network is composed of a plurality of client computers 3, an application server 1, a file server 2, and a network printer 4.

The plurality of client computers 3 are computers with which the user actually processes the data and enters various kinds of commands. The application server 1 stores and manages application software programs used by the client computers 3. The file server 2 saves and updates the data files created by each client computer 3 on the computer network, and manages all these data files collectively. The network printer 4 prints out a data file specified by any of the client computer 3 in a predetermined format.

The computer network may be connected to another computer network through the LAN (Local Area Network), internet or the like.

Figure 1:
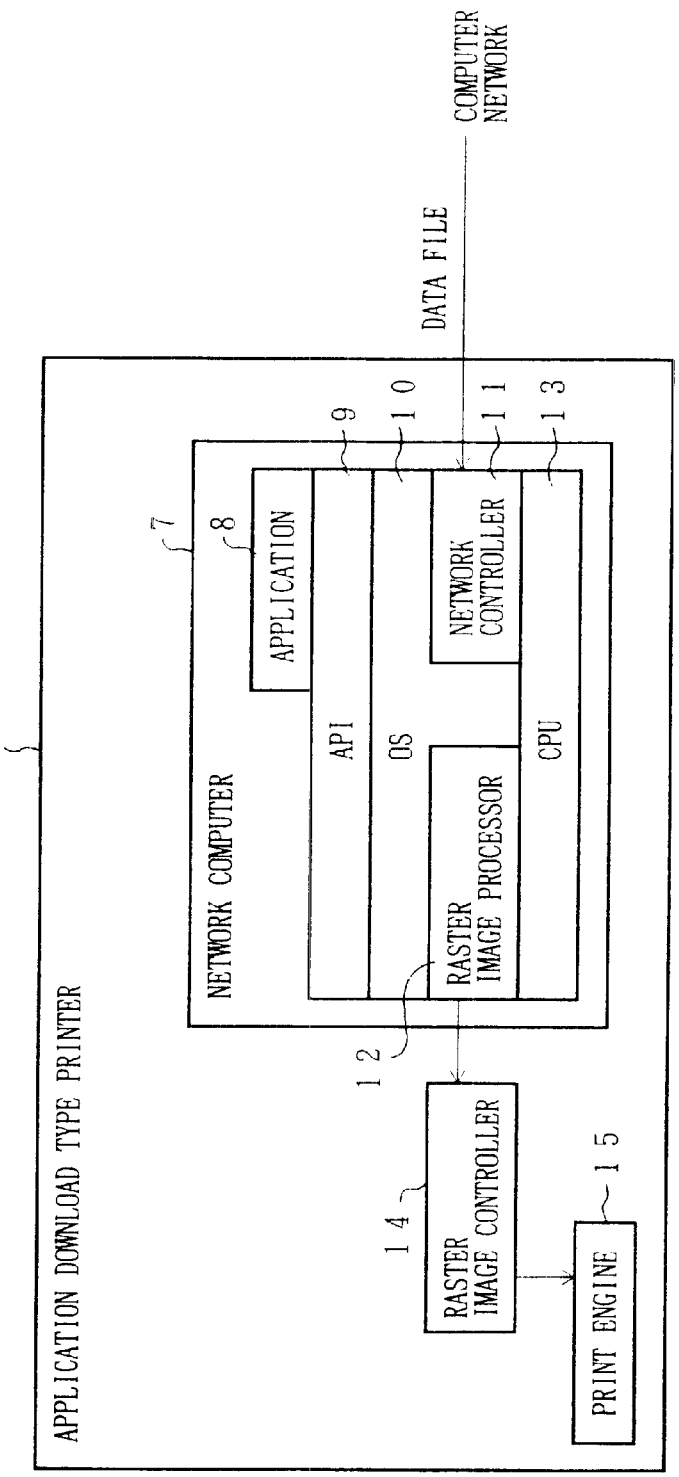
FIG. 1 is a block diagram schematically showing an arrangement of an application download type printer in accordance with an example embodiment of the present invention.

FIG. 1 is a block diagram schematically showing an arrangement of an application download type printer 5 used as the network printer 4. In the drawing, the flow of data file processing is indicated by arrows.

The application download type printer 5 includes a network computer 7, a raster image controller 14, and a print engine 15. The network computer 7 includes a CPU 13 for the network computer, an OS (Operating System) 10 (image converting means) run on the CPU 13, and an API (Application Programming Interface) (image converting means) 9 corresponding to the OS 10. The OS 10 includes a network controller (network control means) 11 and a raster image processor (image converting means) 12.

When the application download type printer 5 carries out the printing job, the network controller 11 downloads an application 8 and a data file created by the application 8 on the computer network. Then, the application 8 is started up in the network computer 7, whereupon the data file is opened by the application 8. The data file is restored to an image in the network computer 7 and converted to a raster image by the raster image processor 12, which is sent to the print engine 15 through the raster image controller 14 to be printed out.

For further understanding, the technical ideas of the network computer 7 will be explained in the following.

The network computer is defined as a client computer which is connected to a high-speed computer network and downloads the applications and data files on the computer network when using the same. The network computer includes a high-speed CPU and a memory of a least necessary capacity. Since the computer network downloads a necessary application and the subject data file on the computer network to its memory for each job, it can omit a hard disk, and therefore, it can be relatively inexpensive.

The network computer system furnished with the above network computer is characterized by the distributed data processing. More specifically, unlike a conventional system where all the jobs are carried out by a massive computer so-called as a main frame, various kinds of data processing are carried out on each network computer.

Thus, the transmission throughout the computer network is limited to the sending/receiving of various kinds of files, namely, the download of the applications and the upload/download of the data files, and commands issued for the above sending/receiving jobs, thereby making it possible to suppress an increase of a traffic volume in the computer network. Also, the applications and files are collectively managed in the application server and file server on the computer network, respectively. Thus, the managing costs, which raises a problem in the server/client method, can be saved.

In the following, the data processing when a data file is printed out from the application download type printer 5 will be explained.

The data file created on the application 8 by the client computer 3 on the computer network is saved in a file format unique to the application 8. This file format can be identical with the format generally stored in a recording medium, such as the file server and floppy disk. The data file will not be restored to an image at the time the data file was created unless the data file is opened by the application 8 used to create the same.

On the other hand, the application download type printer 5 includes the network computer 7 that performs as well as the client computer 3, so that, when the subject data file is printed out, the application download type printer 5 can download the subject data file and the application 8 used to create the same to its memory. The subject data file is opened by the application 8 by the network computer 7 enclosed in the application download type printer 5, and restored to an image. The image of the subject data file thus obtained can be converted directly to a raster image which is used for the printing job.

Each data file is stored in a format where the application information is written in the header portion. Thus, upon receipt of the subject data file from the client computer 3, the application download type printer 5 may possibly download the application 8 from the application server 1 on the computer network based on the header information of the subject data file without receiving a command from the client computer 3.

Figure 3:
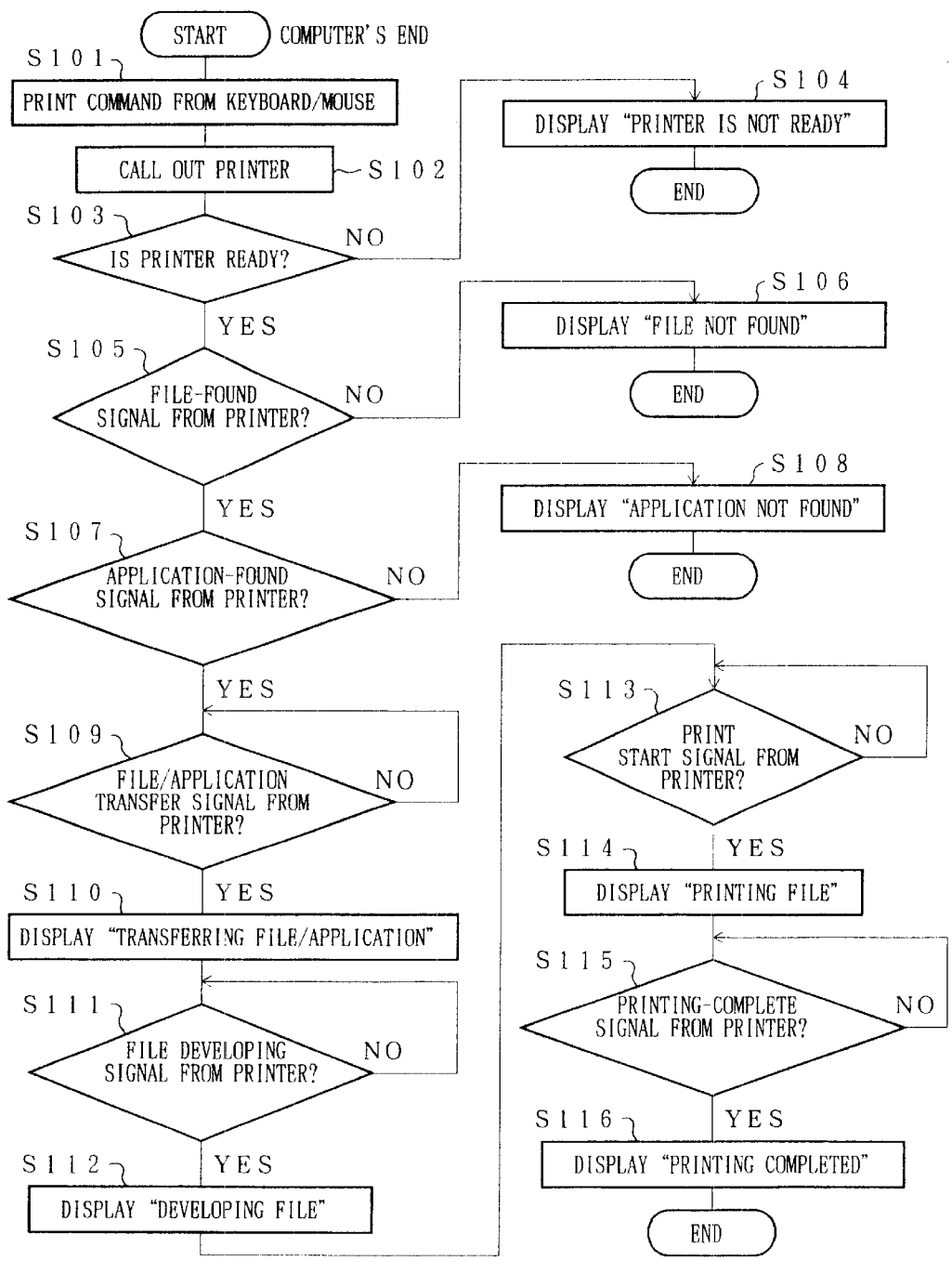
FIG. 3 is a flowchart detailing an overall procedure of the client computer when a data file is printed out from the application download type printer.

Next, an overall procedure of the operation of the client computer 3 when the subject data file is printed out by the application download type printer 5 will be explained in the following with reference to FIG. 3.

A print command for the subject data file to be printed out is issued from the client computer 3 to the application download type printer 5 by the user's manipulation of the keyboard or mouse (Step 101, hereinafter, Step is abbreviated to S), whereupon the application download type printer 5 is called out (S102).

The client computer 3 inquires whether the application download type printer 5 is ready or not (S103). When the application download type printer 5 is not ready (NO in S103), the client computer 3 displays a message "PRINTER IS NOT READY" on its screen to so notify the user (S104), and ends the job.

When the application download type printer 5 is ready (YES in S103), the client computer 3 awaits until the application download type printer 5 finds the subject data file on the computer network (S105). Upon receipt of a file-not-found signal from the application download type printer 5 (NO in S105), the client computer 3 displays a message "FILE NOT FOUND" on its screen to so notify the user (S106), and ends the job.

Upon receipt of a file-found signal from the application download type printer 5 (YES in S105), the client computer 3 awaits until the application download type printer 5 finds the application 8 corresponding to the subject data file (S107). Upon receipt of an application-not-found signal from the application download type printer 5 (NO in S107), the client computer 3 displays a message "APPLICATION NOT FOUND" on its screen to so notify the user (S108), and ends the job.

Upon receipt of an application-found signal from the application download type printer 5 (YES in S107), after having confirmed the receipt of a file/application transfer signal indicating that the subject data file and the application 8 are being transferred from the application download type printer 5 (S109), the client computer 3 displays a message "TRANSFERRING FILE/APPLICATION" on its screen (Silo).

Then, after having confirmed the receipt of a file developing signal indicating that the subject data file is being developed on the network computer 7 enclosed in the application download type printer 5 (S111), the client computer 3 displays a message "DEVELOPING FILE" on its screen (S112).

Further, after having confirmed the receipt of a print start signal indicating that the application download type printer 5 has started the printing job (S113), the client computer 3 displays a message "PRINTING FILE" on its screen (S114).

Finally, after having confirmed the receipt of a printing-complete signal indicating that the application download type printer 5 has finished the printing job (S115), the client computer 3 displays a message "PRINTING COMPLETED" on its screen (S116), and ends the job.

Figure 4:
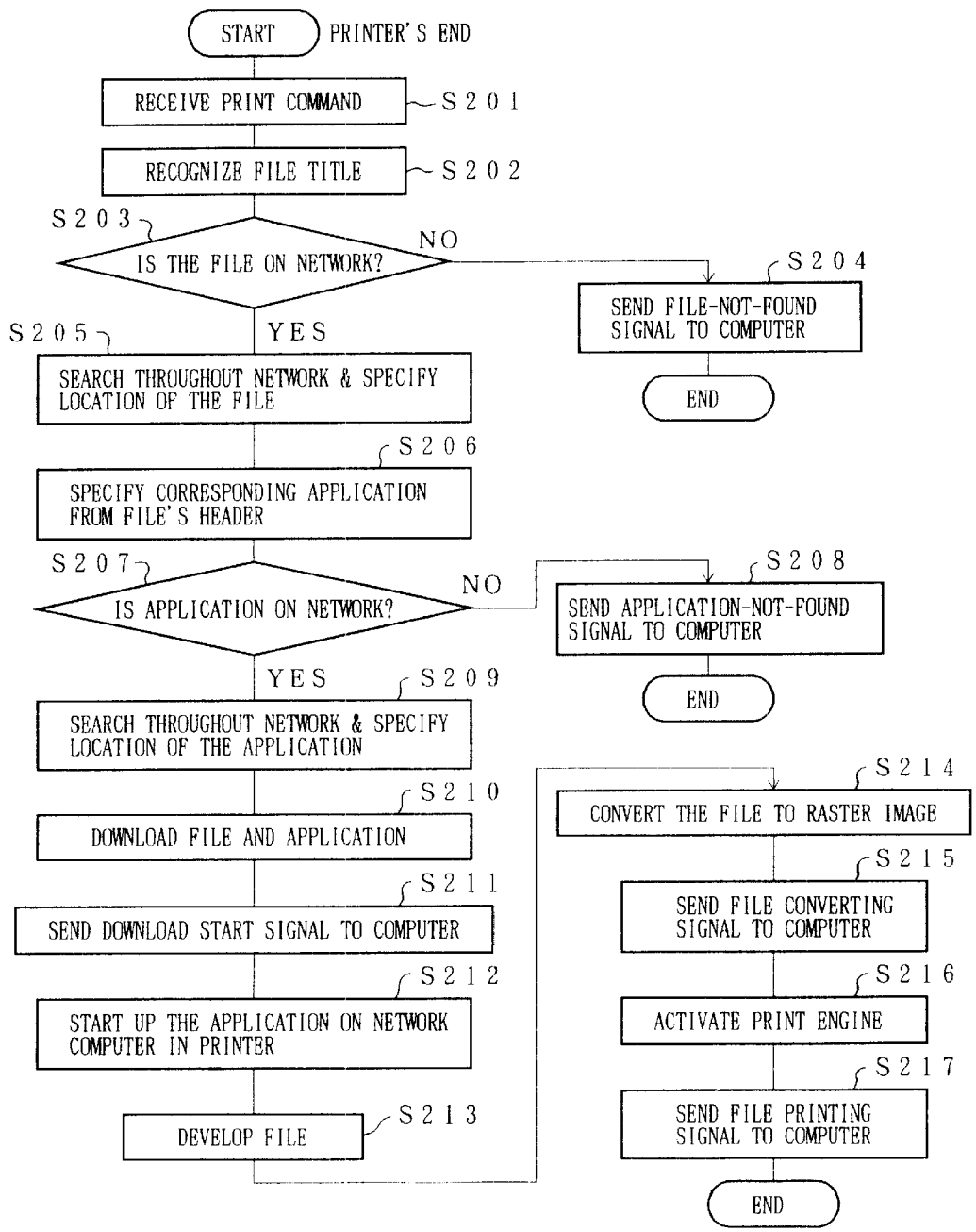
FIG. 4 is a flowchart detailing an overall procedure of the application download type printer when a data file is printed out from the same.

Next, an overall procedure of the operation of the application download type printer 5 when printing out the data file will be explained with reference to FIG. 4.

Upon receipt of a print command from the client computer 3 (S201), the application download type printer 5 recognizes the title of the subject data file to be printed out (S202), and further confirms whether the subject data file is on the network or not (S203). When the application download type printer 5 fails to find the subject data file (NO in S203), the application download type printer 5 sends the file-not-found signal to the client computer 3 (S204), and ends the job.

When the application download type printer 5 has found the subject data file (YES in S203), it sends the file-found signal to the client computer 3 and specifies the location of the subject data file on the computer network (S205). Then, the application download type printer 5 checks the header of the subject data file and specifies the application 8 corresponding to the subject data file (S206).

Then, the application download type printer 5 confirms whether the application 8 is on the computer network or not (S207). When the application download type printer 5 fails to find the application 8 (NO in S207), it sends the application-not-found signal to the client computer 3 (S208), and ends the job.

When the application download type printer 5 has found the application 8 (YES in S207), it sends the application-found signal to the client computer 3 and specifies the location of the application 8 on the computer network (S209). Then, the application download type printer 5 downloads the subject data file and the application 8 (S210), and sends a download start signal to the client computer 3 (S211).

Subsequently, the application 8 is started up on the network computer 7 enclosed in the application download type printer 5 (S212), whereupon the subject data file is developed thereon (S213).

The subject data file restored to an image in the network computer 7 is converted to a raster image (S214). Then, the application download type printer 5 sends a file converting signal to the client computer 3 (S215). Then, the application download type printer 5 activates the print engine 15 (S216), whereby the printing job is started. Subsequently, the application download type printer 5 sends a file printing signal to the client computer 3 (S217), and ends the job.

As has been explained, according to the above arrangement, the subject data file to be printed out and the application 8 corresponding to the subject data file are sent to the application download type printer 5 as the data for the printing job. Thus, unlike the conventional method, the bitmap data of a large volume do not flow throughout the computer network, thereby decreasing a traffic volume in the computer network.

In addition, since the client computer 3 can omit the printer driver and page-description language, a space secured on the recording medium to store the printer driver and page-description language can be omitted as well. Also, the user no longer has to manage the version of each printer driver and can skip the complicated manipulation associated with the printer driver and page-description language when printing out the subject data file.

Likewise, since the application download type printer 5 does not need the page-description language, it can omit the hard disk and memory for storing the page-description language. Consequently, it has become possible to provide a downsized and less expensive application download type printer 5.

Further, since the application download type printer 5 includes the network computer 7, the data processing, which is necessary when printing out the data file, can be carried out in the application download type printer 5, thereby reducing a burden on the client computer 3.

Embodiment 2

Figure 5:
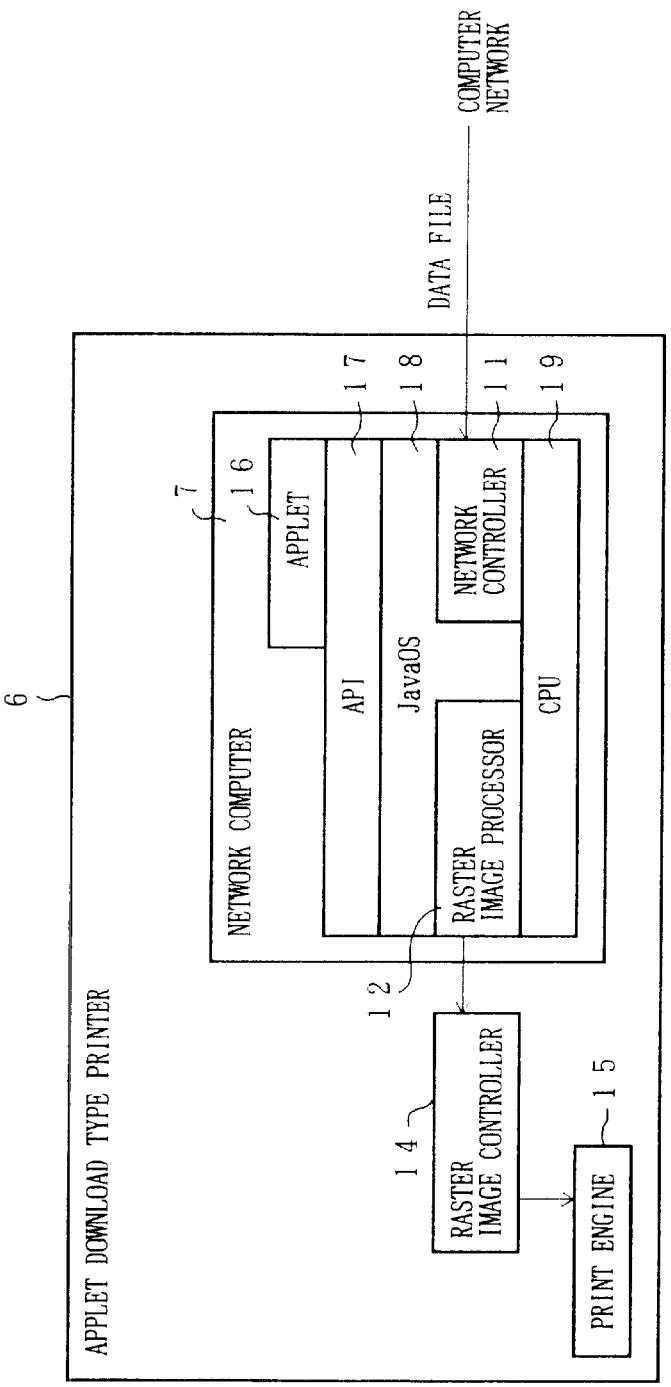
FIG. 5 is a block diagram schematically showing an arrangement of an applet download type printer in accordance with another example embodiment of the present invention.
Figure 6:
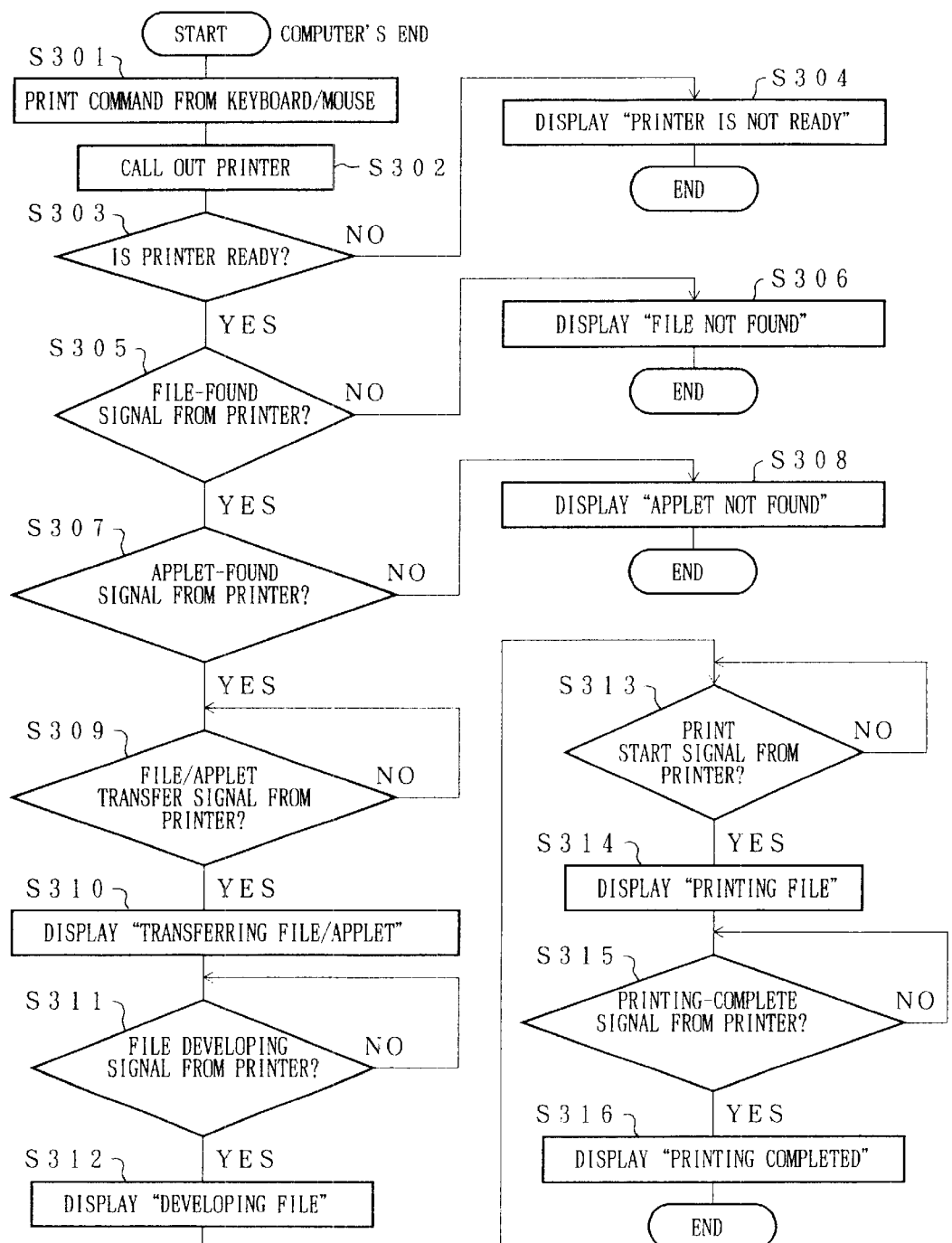
FIG. 6 is a flowchart detailing an overall procedure of the client computer when a data file is printed out from the applet download type printer.
Figure 7:
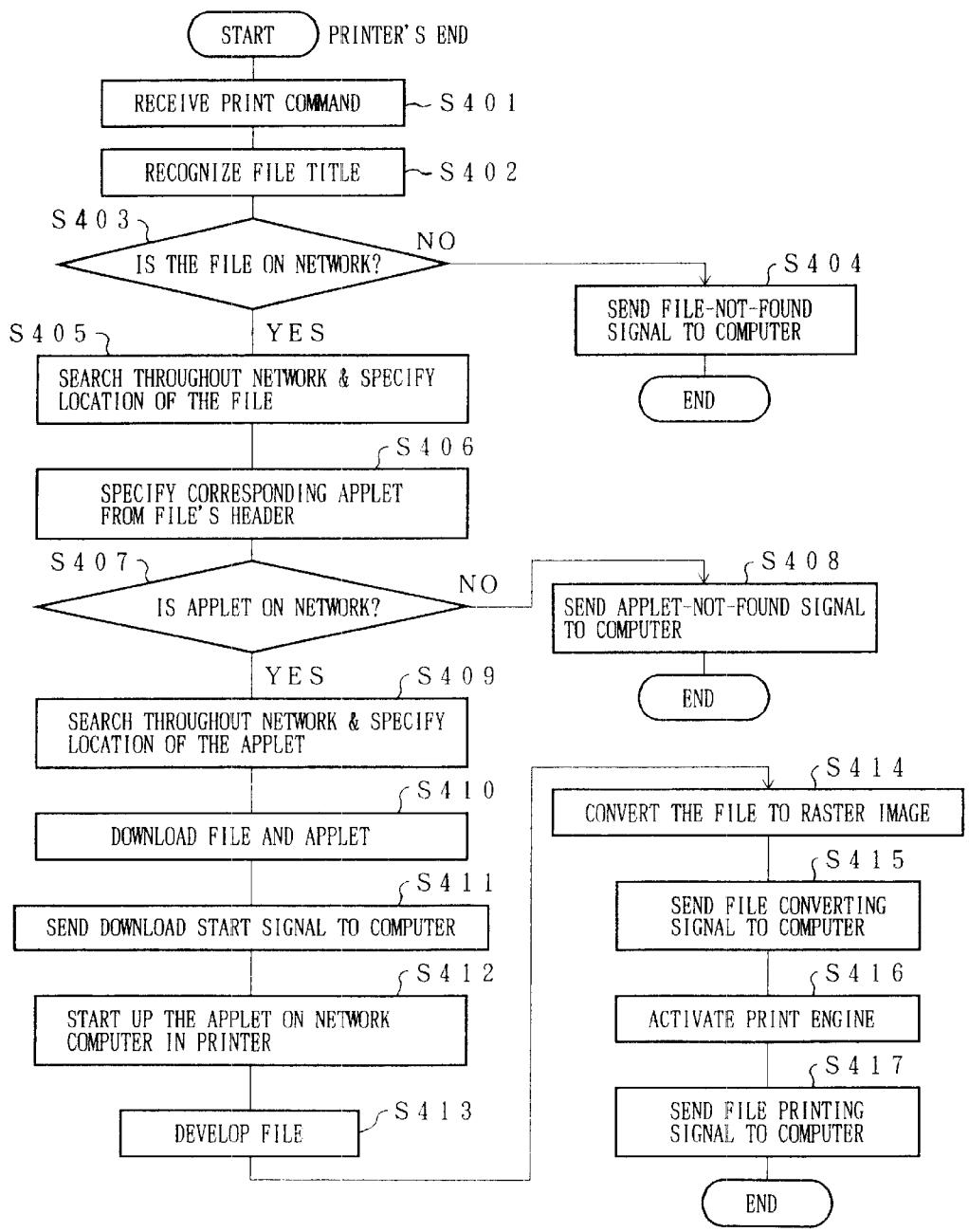
FIG. 7 is a flowchart detailing an overall procedure of the applet download type printer when a data file is printed out from the same.

Referring to FIGS. 5 through 7, the following description will describe another example embodiment of the present invention. Hereinafter, like components are labeled with like reference numerals with respect to Embodiment 1 above, and the description of these components is not repeated for the explanation's convenience.

FIG. 2 schematically shows an arrangement of a computer network of the present embodiment, which is characterized in that a Java® applet download type printer (hereinafter, referred to simply as applet download type printer) 6 is used as the network printer 4.

FIG. 5 is a block diagram schematically showing an arrangement of the applet download type printer 6. In the drawing, the flow of the data file processing is indicated by arrows.

The applet download type printer 6 includes a network computer 7, a raster image controller 14, and a print engine 15. The network computer 7 includes a CPU 19 for JavaOS®, a JavaOS® 18 run on the CPU 19, and an API 17 corresponding to the JavaOS® 18. The JavaOS® 18 includes a network controller 11 and a raster image processor 12.

The network controller 11 downloads a Java® applet (hereinafter, referred to simply as applet) 16 and a data file created by the applet 16 on the computer network. Then, the applet 16 is started up in the network computer 7, whereby the subject data file is opened by the applet 16. The subject data file is restored to an image in the network computer 7, and converted to a raster image by the raster image processor 12. Subsequently, the raster image is sent to the print engine 15 through the raster image controller 14 to be printed out.

Here, the summary and feature of the Java® will be given in the following for further understanding. Java® is an object-oriented development language developed by Sun Microsystems, Inc. This language is an intermediate code-interpreter type language, and can be run faster than an ordinary interpreter type language and has a smaller execution file compared with a compiler type language. Thus, the application can be constructed in a size such that allows the application to move throughout the computer network.

Further, since an interpreter for the Java® language, called as a virtual machine custermized for each OS, is provided, an execution file by Java® is executable on any OS. Also, the Java® applet (applet) is defined as an application of a small size written in the Java® language.

As has been explained, using the Java® language can realize an OS-independent application of a small size.

Next, a brief explanation of the data processing when the data file is printed out from the applet download type printer 6 will be given in the following.

The data file created with the client computer 3 on the computer network is saved in a file format unique to the applet 16 used to created the same. This file format can be identical with a format generally stored in a recording medium, such as the file server and floppy disk. Generally, the data file can not be restored to an image at the time the data file was created unless the data file is opened by the applet 16 used to create the same.

On the other hand, the applet download type printer 6 includes the network computer 7 that performs as well as the client computer 3, so that, when the subject data file is printed out, the applet download type printer 6 downloads the subject data file and the applet 16 used to create the same to its memory. The data file is opened by the applet 16 on the network computer 7 enclosed in the applet download type printer 6, and restored to an image. The image of the subject data file thus obtained can be converted directly to a raster image which is used for the printing job.

The data file is saved in a format where the applet information is written in the header portion. Thus, upon receipt of the subject data file from the client computer 3, the applet download type printer 6 may possibly download the applet 16 from the application server 1 on the computer network based on the header information of the subject data file.

Next, an overall procedure of the operation of the client computer 3 when the subject data file is printed out from the applet download type printer 6 will be explained in the following with reference to FIG. 6.

A print command for the subject data file to be printed out is issued from the client computer 3 to the applet download type printer 6 by the user's manipulation of the keyboard or mouse (S301), whereupon the applet download type printer 6 is called out (S302).

The client computer 3 inquires whether the applet download type printer 6 is ready or not (S303). When the applet download type printer 6 is not ready (NO in S303), the client computer 3 displays a message "PRINTER IS NOT READY" on its screen to so notify the user (S304), and ends the job.

When the applet download type printer 6 is ready (YES in S303), the client computer 3 awaits until the applet download type printer 6 finds the subject data file on the computer network (S305). Upon receipt of a file-not-found signal from the applet download type printer 6 (NO in S305), the client computer 3 displays a message "FILE NOT FOUND" on its screen to so notify the user (S306), and ends the job.

Upon receipt of a file-found signal from the applet download type printer 6 (YES in S305), the client computer 3 awaits until the applet download type printer 6 finds the applet 16 corresponding to the subject data file (S307). Upon receipt of an applet-not-found signal from the applet download type printer 6 (NO in S307), the client computer 3 displays a message "APPLET NOT FOUND" on its screen to so notify the user (S308), and ends the job.

Upon receipt of an applet-found signal from the applet download type printer 6 (YES in S307), after having confirmed the receipt of a file/applet transfer signal indicating that the subject data file and applet 16 are being transferred from the applet download type printer 6 (S309), the client computer 3 displays a message "TRANSFERRING FILE/ APPLET" on its screen (S310).

Then, after having confirmed the receipt of a file developing signal indicating that the subject data file is being developed on the network computer 7 enclosed in the applet download type printer 6 (S311), the client computer 3 displays a message "DEVELOPING FILE" on its screen (S312). Further, after having confirmed the receipt of a print start signal indicating that the applet download type printer 6 has started the printing job (S313), the client computer 3 displays a message "PRINTING FILE" on its screen (S314). Finally, after having confirmed the receipt of a printing-complete signal indicating that the applet download type printer 6 has finished the printing job (S315), the client computer 3 displays a message "PRINTING COMPLETED" on its screen (S316), and ends the job.

Next, an overall procedure of the operation of the applet download type printer 6 when printing out the data file will be explained with reference to FIG. 7.

Upon receipt of a print command from the client computer 3 (S401), the applet download type printer 6 recognizes the title of the subject data file to be printed out (S402), and further confirms whether the subject data file is on the network or not (S403). When the applet download type printer 6 fails to find the subject data file (NO in S403), it sends the file-not-found signal to the client computer 3 (S404), and ends the job.

When the applet download type printer 6 has found the subject data file (YES in S403), it sends the file-found signal to the client computer 3 and specifies the location of the subject data file on the computer network (S405). Then, the applet download type printer 6 checks the header of the subject data file and specifies the applet 16 corresponding to the subject data file (S406).

Then, the applet download type printer 6 confirms whether the applet 16 is on the computer network or not (S407). When the applet download type printer 6 fails to find the applet 16 (NO in S407), it sends the applet-not-found signal to the client computer 3 (S408), and ends the job.

When the applet download type printer 6 has found the applet 16 (YES in S407), it sends the applet-found signal to the client computer 3 and specifies the location of the applet 16 on the computer network (S409). Then, the applet download type printer 6 downloads the subject data file and the applet 16 (S410), and sends a download start signal to the client computer 3 (S411).

Subsequently, the applet 16 is started up on the network computer 7 enclosed in the applet download type printer 6 (S412), whereupon the subject data file is developed thereon (S413).

The subject data file restored to an image in the network computer 7 is converted to a raster image (S414). Meanwhile, the applet download type printer 6 sends a file converting signal to the client computer 3 (S415). Then, the applet download type printer 6 activates the print engine 15 (S416). Subsequently, the applet download type printer 6 sends a file printing signal to the client computer 3 (S417), and ends the job.

As has been explained, according to the above arrangement, the effect similar to the effect attained by Embodiment 1 above can be achieved. Further, since the applet 16 is OS-independent, the applet download type printer 6 can print out a data file created by computers adopting any type of OS. Consequently, the user can skip a troublesome job to manipulate the client computer 3 depending on the type of printer the user is going to use.

Embodiment 3

Figure 8:
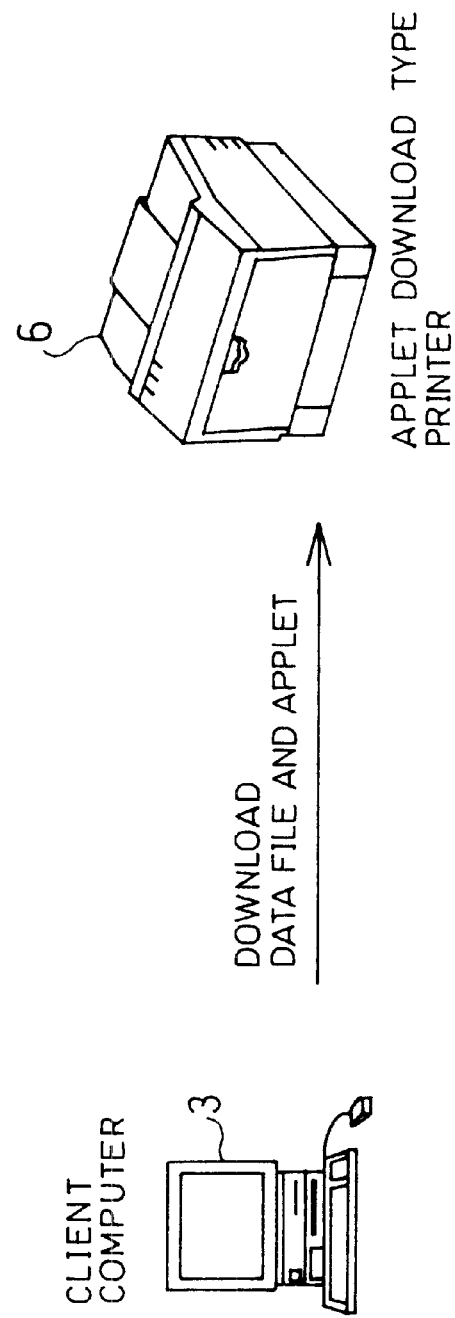
FIG. 8 is a view schematically explaining how the data are sent/received when a data file is printed out from an applet download type printer in accordance with still another embodiment of the present invention.
Figure 9:
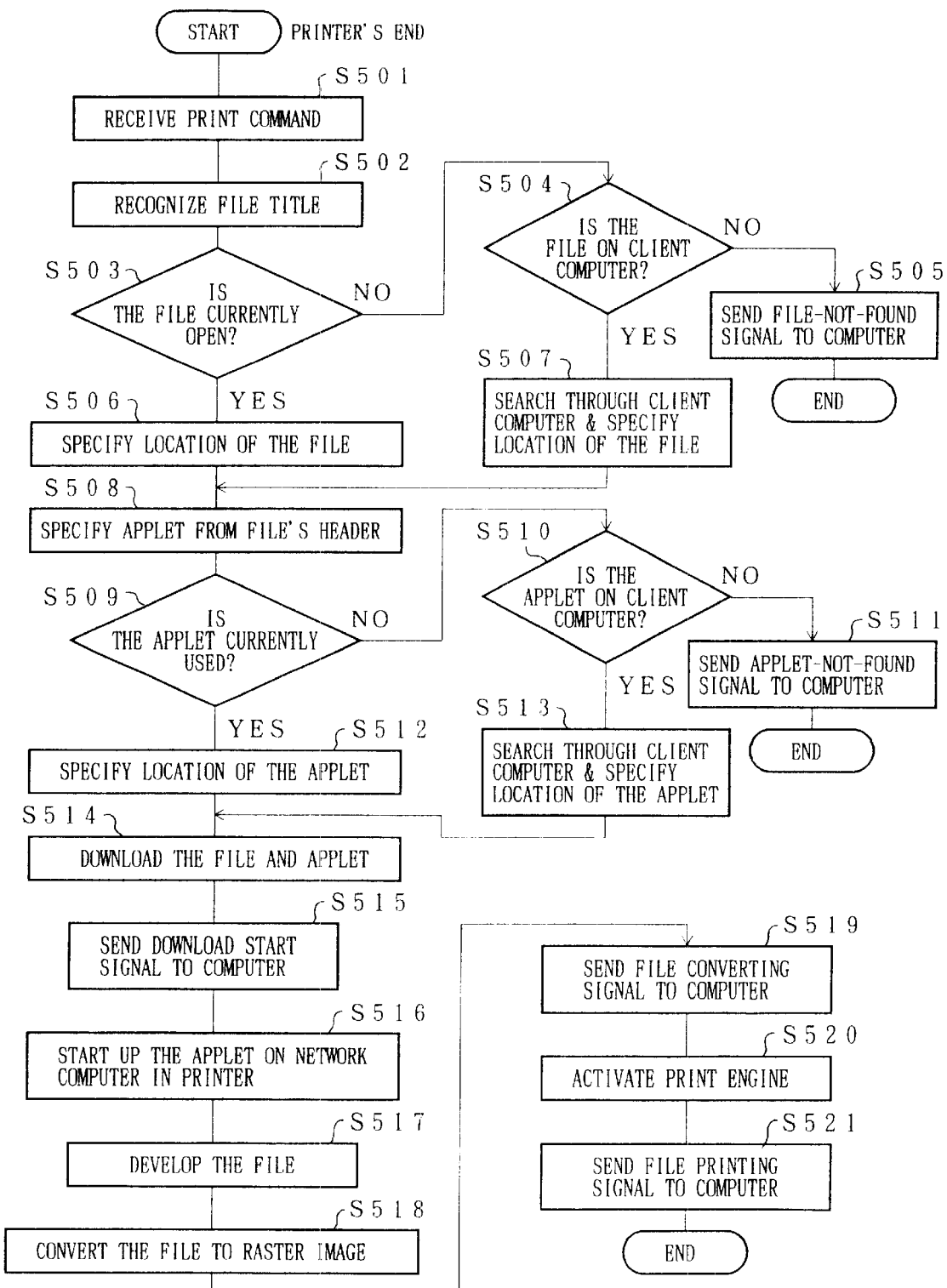
FIG. 9 is a flowchart detailing an overall procedure of the applet download type printer of FIG. 8 when a data file is printed out from the same.

Referring to FIGS. 8 and 9, the following description will describe still another example embodiment of the present invention. Hereinafter, like components are labeled with like reference numerals with respect to Embodiments 1 and 2 above, and the description of these components is not repeated for the explanation's convenience.

In the present embodiment, explained as an example is a case where the applet download type printer 6 prints out a subject data file by downloading the subject data file and a corresponding applet from the client computer 3.

The data processing for the printing job in the above case will be briefly explained in the following with reference to FIG. 8. The applet download type printer 6 downloads a subject data file and a corresponding applet 16 from the client computer 3. In the present embodiment, the client computer 3 can be either a conventional client computer or the one serving as the network computer.

Upon receipt of a print command from the client computer 3, the applet download type printer 6 downloads the subject data file to be printed out and the corresponding applet stored in the client computer 3. Then, the subject data file is opened by the applet 16 on the network computer 7 enclosed in the applet download type printer 6 and restored to an image. The image of the subject data file thus obtained can be converted directly to a raster image used for the printing job.

Next, an overall procedure of the printing job by the applet download type printer 6 when it prints out the subject data file by downloading the subject data file and the corresponding applet from the client computer 3 will be explained in the following with reference to FIG. 9.

Upon receipt of a print command from the client computer 3 (S501), the applet download type printer 6 recognizes the title of the subject data file to be printed out (S502), and further confirms whether the subject data file is currently open or not (S503). When the subject data file is currently open (YES in S503), the applet download type printer 6 specifies the location of the subject data file (S506).

When the subject data file is not currently open (NO in S503), the applet download type printer 6 confirms whether the subject data file is on the client computer 3 (S504). When the subject data file is on the client computer 3 (YES in S504), the applet download type printer 6 searches through the client computer 3 and specifies the location of the subject data file (S507). When the applet download type printer 6 fails to find the subject data file on the client computer 3 (NO in S504), it sends a file-not-found signal to the client computer 3 (S505), and ends the job.

When the applet download type printer 6 has found the subject data file, it sends a file-found signal to the client computer 3, and checks the header of the subject data file to specify an applet 16 corresponding to the subject data file (S508).

Then, the applet download type printer 6 confirms whether the applet 16 is currently used or not (S509). When the applet 16 is currently used (YES in S509), the applet download type printer 6 specifies the location of the applet 16 (S512). When the applet 16 is not currently used (NO in S509), the applet download type printer 6 confirms whether the applet 16 is on the client computer 3 or not (S510). When the applet download type printer 6 fails to find the applet 16 (NO in S510), it sends an applet-not-found signal to the client computer 3 (S511), and ends the job.

When the applet download type printer 6 has found the applet 16 (YES in S510), it sends an applet-found signal to the client computer 3, and specifies the location of the applet 16 on the client computer 3 (S513). Then, the applet download type printer 6 downloads the subject data file and applet 16 (S514), and sends a download start signal to the client computer 3 (S515).

Subsequently, the applet 16 is started up on the network computer 7 enclosed in the applet download type printer 6 (S516), whereupon the subject data file is developed thereon (S517).

The subject data file restored to an image in the network computer 7 is converted to a raster image (S518). Meanwhile, the applet download type printer 6 sends a file converting signal to the client computer 3 (S519). Then, the applet download type printer 6 activates the print engine 15

(S520), after which it sends a file printing signal to the client computer 3 (S521) and ends the job.

As has been explained, according to the above arrangement, like the arrangement of Embodiment 2 above, a traffic volume in the computer network can be reduced. Also, the management of the printer driver and the page-description language, and the hard disk for storing the printer driver and page-description language can be omitted. Consequently, the applet download type printer 6 can print out a data file created by the client computer 3 adopting any type of OS.

Moreover, the applet download type printer 6 can print out the subject data file without starting up the applet 16 on the client computer 3 only if the applet 16 and the subject data file are sent to the same. Thus, the CPU of the client computer 3 is less occupied during the printing job.

Also, since the user does not have to start up the applet 16, the user can save the time for the start-up, and therefore, improve the workability.

In the present embodiment, the example using the applet download type printer 6 is explained. However, similar function and effect can be achieved when the application download type printer 5 is used instead.

Embodiment 4

Figure 10:
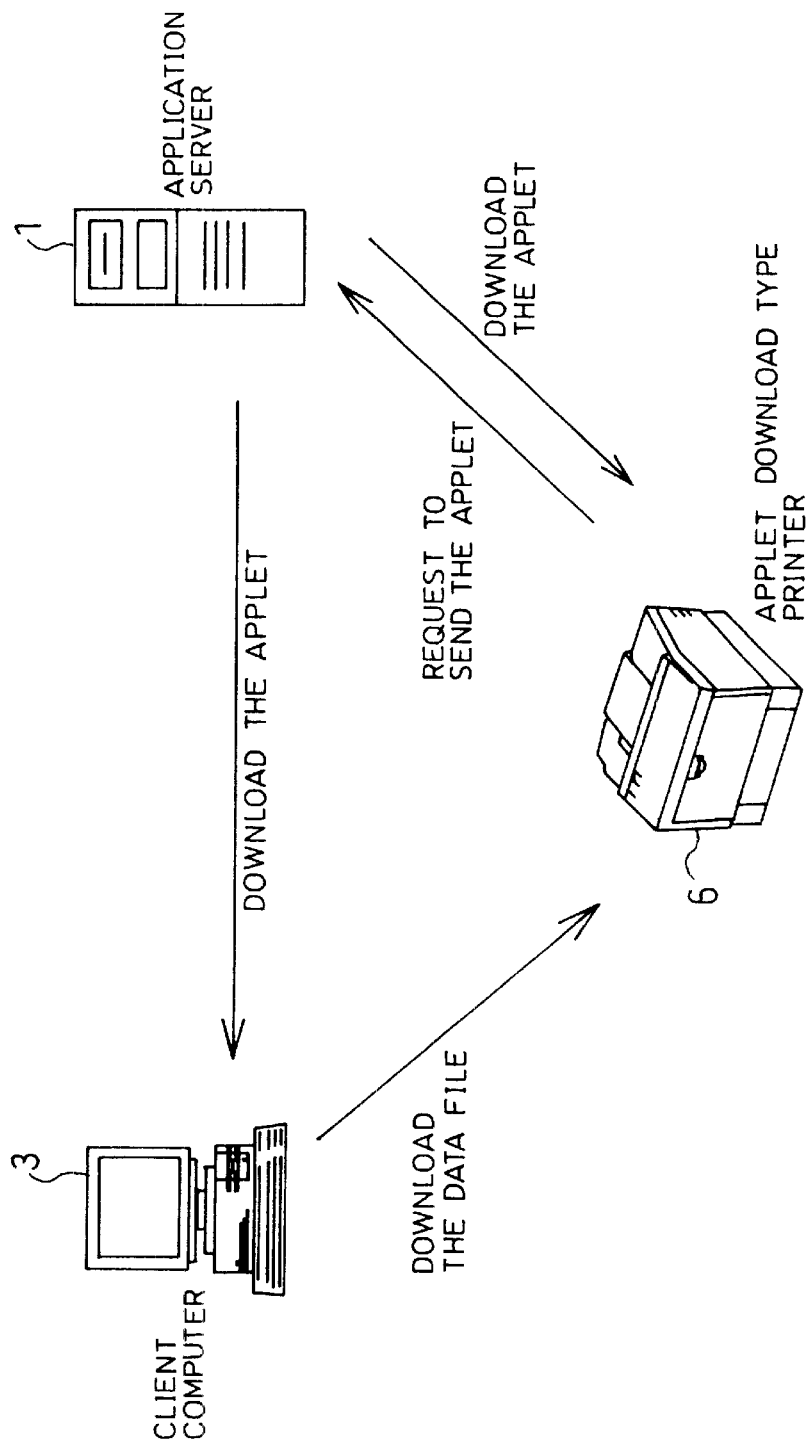
FIG. 10 is a view schematically explaining how the data are sent/received when a data file is printed out from an applet download type printer in accordance with still another embodiment of the present invention.
Figure 11:
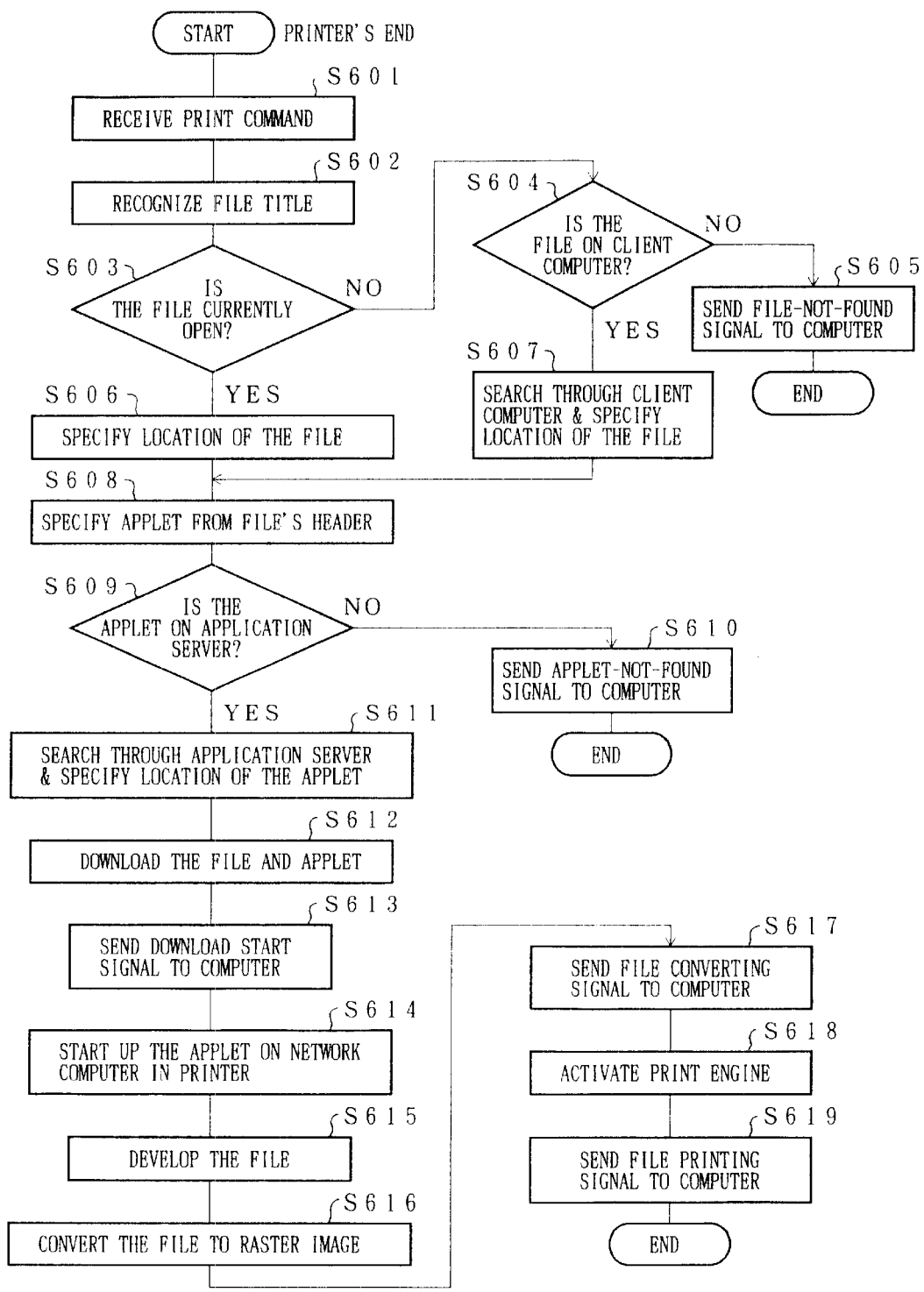
FIG. 11 is a flowchart detailing an overall procedure of the applet download type printer of FIG. 10 when a data file is printed out from the same.

Referring to FIGS. 10 and 11, the following description will describe still another example embodiment of the present invention. Hereinafter, like components are labeled with like reference numerals with respect to Embodiments 1, 2 and 3 above, and the description of these components is not repeated for the explanation's convenience.

Explained in the present embodiment is an example case where the applet download type printer 6 prints out a subject data file by downloading the subject data file and applet 16 corresponding to the subject data file from the client computer 3 and application server 1, respectively.

The data processing for the printing job in the above example case will be explained briefly in the following with reference to FIG. 10. The applet download type printer 6 downloads the subject data file and applet 16 corresponding to the subject data file from the client computer 3 and application server 1, respectively. Which applet 16 should be downloaded is determined based on the header information of the subject data file. In the present embodiment, the client computer 3 can be either a conventional client computer or the one serving as the network computer.

Upon receipt of a print command from the client computer 3, the applet download type printer 6 downloads the subject data file to be printed out stored in the client computer 3 and the applet 16 corresponding to the subject data file stored in the application server 1. Then, the subject data file is opened by the applet 16 on the network computer 7 enclosed in the applet download type printer 6, and restored to an image. The restored image of the subject data file can be converted directly to a raster image used for the printing job.

Next, an overall procedure when the applet download type printer 6 prints out a subject data file by downloading the subject data file from the client computer 3 and the applet 16 corresponding to the subject data file from the application server 1 will be explained with reference to FIG. 11.

Upon receipt of a print command from the client computer 3 (S601), the applet download type printer 6 recognizes the title of the subject data file to be printed out (S602), and further confirms whether the subject data file is currently open or not (S603). When the subject data file is currently open (YES in S603), the applet download type printer 6 specifies the location of the subject data file (S606).

When the subject data file is not currently open (NO in S603), the applet download type printer 6 confirms whether the subject data file is on the client computer 3 or not (S604). When the subject data file is on the client computer 3 (YES in S604), the applet download type printer 6 searches through the client computer 3, and specifies the location of the subject data file (S607).

When the applet download type printer 6 fails to find the subject data file on the client computer 3 (NO in S604), it sends a file-not-found signal to the client computer 3 (S605), and ends the job.

When the applet download type printer 6 has found the subject data file, it sends a file-found signal to the client computer 3. Then, the applet download type printer 6 checks the header of the subject data file, and specifies the applet 16 corresponding to the subject data file (S608).

Next, the applet download type printer 6 confirms whether the applet 16 is on the application server 1 or not (S609). When the applet download type printer 6 fails to find the applet 16 (NO in S609), it sends an applet-not-found signal to the client computer 3 (S610), and ends the job.

When the applet download type printer 6 has found the subject data file (YES in S609), it sends an applet-found signal to the client computer 3 and specifies the location of the applet 16 on the application server 1 (S611). Then, the applet download type printer 6 downloads the subject data file from the client computer 3 and the applet 16 from the application server 1 (S612), and sends a download start signal to the client computer 3 (S613).

Then, the applet 16 is started up on the network computer 7 enclosed in the applet download type printer 6 (S614), whereupon the subject data file is developed thereon (S615).

The subject data file restored to an image in the network computer 7 is converted to a raster image (S616). Subsequently, the applet download type printer 6 sends a file converting signal to the client computer 3 (S617). Then, the applet download type printer activates the print engine 15 (S618), after which it sends a file printing signal to the client computer 3 (S619) and ends the job.

As has been explained, according to the above arrangement, an effect similar to the effect achieved by Embodiment 3 above can be attained. Moreover, the following effects can be achieved as well.

That is, even when the subject data file was created by the applet 16 which is not on the client computer 3 that issues a print command, the applet download type printer 6 downloads the applet 16 corresponding to the subject data file from the application server 1. Thus, the applet download type printer 6 can print out the subject data file only if the client computer 3 sends the subject data file to the same. Since the applet download type printer 6 can specify the applet 16 at this point by checking the header of the subject data file, the user does not have to specify the applet corresponding to the subject data file on the client computer 3.

In addition, since the applets 16 are stored in the application server 1, the applets 16 can be managed collectively. Consequently, the version of each applet 16 can be managed more easily and an unauthenticated use of the applets 16 can be prevented.

In the present embodiment, an example case using the applet download type printer 6 is explained. However, similar function and effect can be obtained if the application download type printer 5 is used instead.

Embodiment 5

Figure 12:
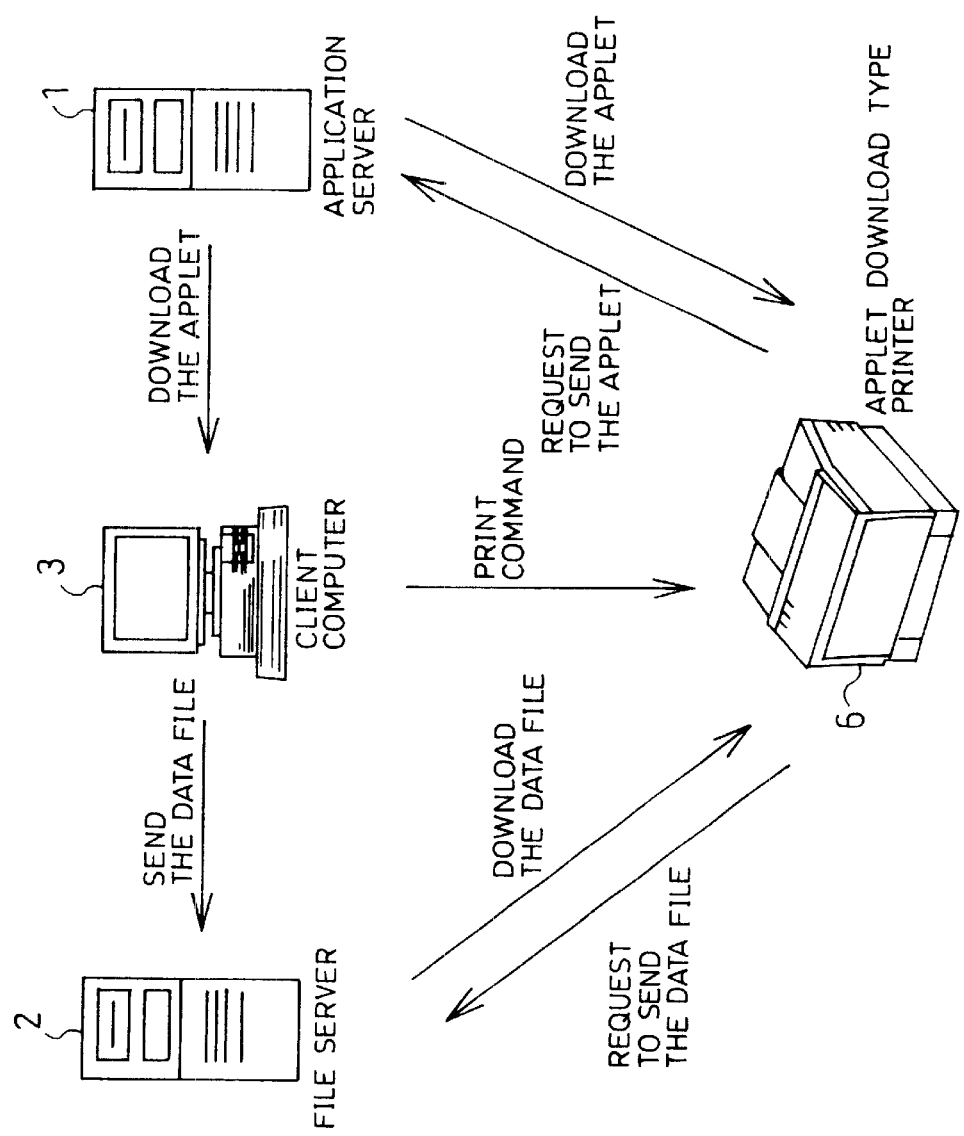
FIG. 12 is a view schematically explaining how the data are sent/received when a data file is printed out from an applet download type printer in accordance with still another embodiment of the present invention.
Figure 13:
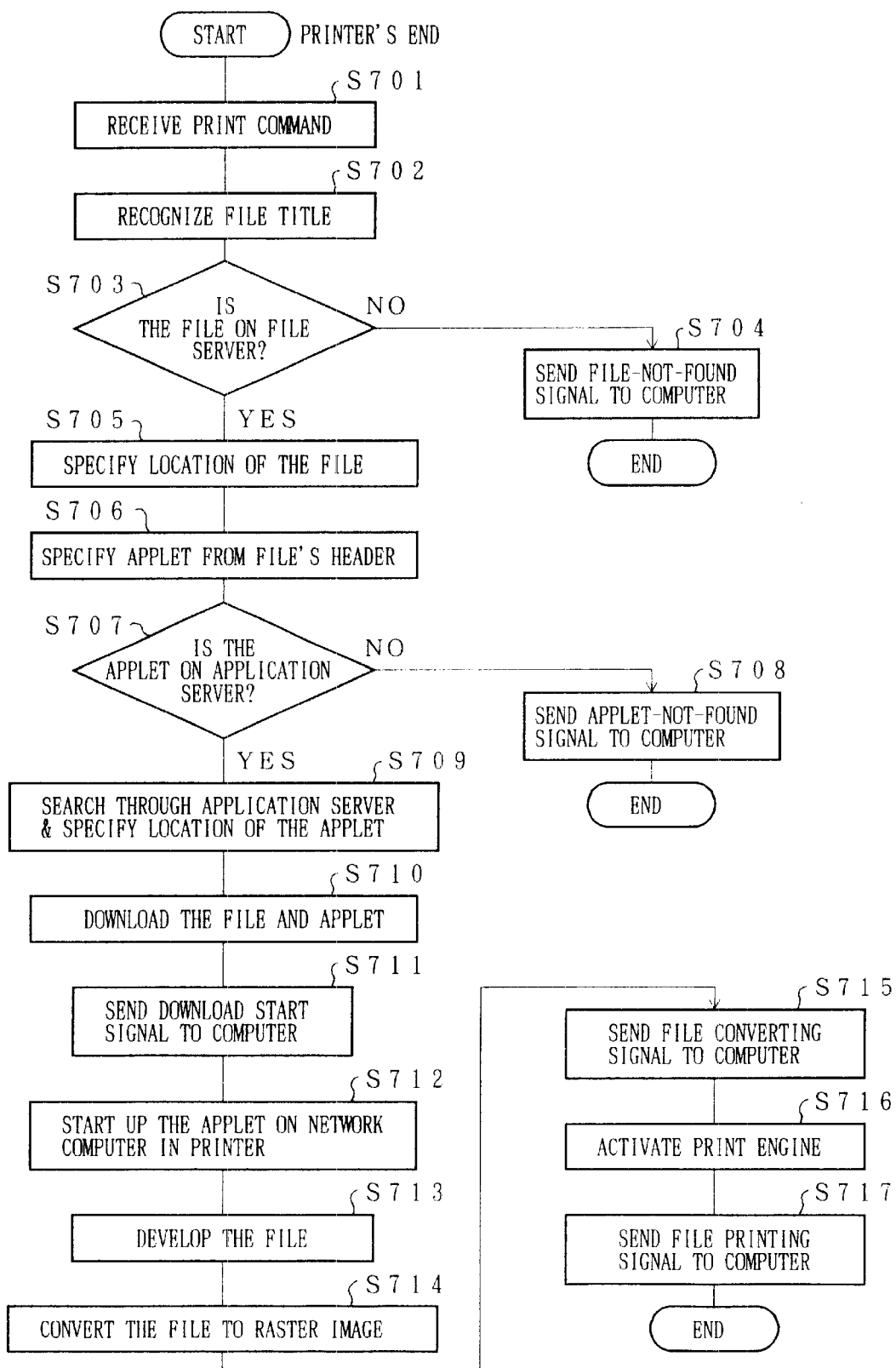
FIG. 13 is a flowchart detailing an overall procedure of the applet download type printer of FIG. 12 when a data file is printed out from the same.

Referring to FIGS. 12 and 13, the following description will describe still another example embodiment of the present invention. Hereinafter, like components are labeled with like reference numerals with respect to Embodiments 1, 2, 3, and 4 above and the description of these components is not repeated for the explanation's convenience.

Explained in the present embodiment is an example case where the applet download type printer 6 prints out a subject data file by downloading the subject data file and applet 16 corresponding to the subject data file from the file server 2 and application server 1, respectively.

The data processing for the printing job in this example case will be explained briefly in the following with reference to FIG. 12. A data file created using an applet on the client computer 3 is stored in the file server 2 first. Then, upon receipt of a print command from the client computer 3, the applet download type printer 6 downloads the subject data file from the file server 2, and it also downloads an applet 16 corresponding to the subject data file from the application server 1. The print command can be very short because it only has to specify where the subject data file to be printed out is stored.

In the present embodiment, the client computer 3 can be either a conventional client computer or the one serving as the network computer. Also, a single computer may serve as both the application server 1 and file server 2.

Which applet 16 should be downloaded is determined based on the header information of the subject data file. Then, the subject data file is opened by the applet 16 on the network computer 7 enclosed in the applet download type printer 6, and restored to an image. The image of the subject data file thus obtained can be converted directly to a raster image for the printing job.

Next, an overall procedure when the applet download type printer 6 prints out the subject data file by downloading the subject data file from the file server 2 and the applet 16 corresponding to the subject data file from the application server 1 will be explained in the following with reference to FIG. 13.

Upon receipt of a print command from the client computer 3 (S701), the applet download type printer 6 recognizes the title of the subject data file to be printed out (S702), and further confirms whether the subject data file is on the file server 2 or not (S703). When the applet download type printer 6 fails to find the subject data file (NO in S703), it sends a file-not-found signal to the client computer 3 (S704), and ends the job.

When the applet download type printer 6 has found the subject data file (YES in S703), it sends a file-found signal to the client computer 3, and specifies the location of the subject data file (S705). Subsequently, the applet download type printer 6 checks the header of the subject data file and specifies the applet 16 corresponding to the subject data file (S706).

Then, the applet download type printer 6 confirms whether the applet 16 is on the application server 1 or not (S707). When the applet download type printer 6 fails to find the applet 16 (NO in S707), it sends an applet-not-found signal to the client computer 3 (S708), and ends the job.

When the applet download type printer 6 has found the applet 16 (YES in S707), it sends an applet-found signal to the client computer 3, and searches through the application server 1 to specify the location of the applet 16 (S709). Then, the applet download type printer 6 downloads the subject data file from the file server 2 and the applet 16 from the application server 1 (S710), and sends a download start signal to the client computer 3 (S711).

Subsequently, the applet 16 is started up on the network computer 7 enclosed in the applet download type printer 6 (S712), whereupon the subject data file is developed thereon (S713).

The subject data file is restored to an image and converted to a raster image in the network computer 7 (S714). Meanwhile the applet download type printer 6 sends a file converting signal to the client computer 3 (S715). Then, the applet download type printer 6 activates the print engine 15 (S716), after which it sends a file printing signal to the client computer 3 (S717) and ends the job.

As has been explained, according to the above arrangement, an effect similar to the effect achieved by the arrangement of Embodiment 4 above can be attained. Moreover, the following effects can be achieved as well.

That is, even when the subject data file to be printed out is not on the client computer 3, the applet download type printer 6 can print out the subject data file by downloading the same from the file server 2. Thus, the applet download type printer 6 can print out any data file on the file server 2 without downloading the same to the client computer 3 the user is currently using. In addition, since the client computer 3 only has to specify the subject data file to be printed out, a very small portion of the CPU is occupied during the printing job, thereby minimizing the affect on the other jobs also run by the client computer 3.

In the present embodiment, an example case using the applet download type printer 6 is explained. However, similar function and effect can be obtained if the application download type printer 5 is used instead.

As has been explained, a printer of the present invention, enclosing a network computer and employed on a computer network, is characterized by enclosing said network computer including:

network control means for downloading a data file and an application corresponding to said data file from said computer network; and image converting means for starting up said application and converting said data file into a raster image.

In the above arrangement, the application may be Java® applet.

According to the above arrangement, since the Java® applet is OS-independent, a data file created by the Java® applet on any OS can be downloaded to be printed out. In other words, the printer enclosing the network computer can be shared by the computers adopting any OS. Also, since the user does not have to select the printer corresponding to the OS on which the subject data file was created, a burden on the user when the user enters a print command by manipulating the client computer can be reduced.

Also, a computer network system of the present invention is a computer network system, wherein a printer enclosing a network computer is connected to a plurality of apparatuses including a computer, characterized in that said network computer enclosed in said printer includes:

network control means for downloading a subject data file to be printed out and an application corresponding to said subject data file from any of said plurality of apparatuses on said computer network system; and image converting means for starting up said application and converting said subject data file into a raster image.

The above computer network system may be arranged in such a manner that:

said plurality of apparatuses further include a client computer; and said network control means downloads said subject data file and said application from said client computer.

According to the above arrangement, the subject data file can be printed out only by sending the subject data file and the application corresponding to the subject data file from the client computer. Thus, a burden on the client computer can be reduced and the processing time by the client computer can be cut shorter, thereby making it possible to improve the work efficiency.

Further, the above computer network system may be arranged in such a manner that:

said plurality of apparatuses further include a client computer and an application server; and said network control means downloads said subject data file and said application from said client computer and said application server, respectively.

According to the above arrangement, even when the application corresponding to the subject data file to be printed out is not on the client computer that issues a print command, the printer enclosing the network computer can download the application corresponding to the subject data file from the application server only if the client computer sends the subject data file to the same. Also, providing the application server makes it possible to manage the applications collectively. Thus, unauthenticated use of the applications can be readily prevented and the version of each application can be managed more easily.

The above computer network system may be arranged in such a manner that:

said plurality of apparatuses further include a client computer, an application server, and a file server; and said network control means downloads, at a print command issued by said client computer, said subject data file and said application from said file server and said application server, respectively.

According to the above arrangement, even when neither the subject data file to be printed out nor the application corresponding to the subject data file is on the client computer that issues a print command, the printer enclosing the network computer can download the subject data file from the file server and the application from the application server only if the client computer specifies the subject data file. Thus, since the client computer only has to specify the subject data file, a very small portion of the CPU is occupied during the printing job.

The above computer network system may be arranged in such a manner that said application is a Java® applet.

According to the above arrangement, since the Java® applet is OS-independent, a data file created by the Java® applet on any OS can be downloaded to be printed out from the printer enclosing the network computer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printer employed on a computer network, said printer comprising:

a network computer; and wherein said network computer includes:

network control means for downloading a subject data file to be printed out that has not been converted into a raster image, and an application corresponding to said subject data file from said computer network based on a print command issued by a client computer connected to said computer network;

specifying means for specifying said application corresponding to said subject data file by checking application information in said subject data file;

image converting means for starting up said application and converting said subject data file into the raster image; and wherein after said application corresponding to said subject data file is specified by said specifying means, said network control means downloads said application as specified by said specifying means from said computer network.

2. The printer of claim 1, wherein said image converting means includes:

an operating system for running said application; and a raster image processor for converting said subject data file opened by said application to the raster image on said operating system.

3. The printer of claim 1, wherein said network computer has means for retrieving said subject data file and said application corresponding to said subject data file from said computer network.

4. The printer of claim 1, wherein said network computer has means for specifying said application corresponding to said subject data file by checking a header of said subject data file.

5. The printer of claim 1, wherein said network computer has means for, upon receipt of the print command from said client computer connected to said computer network, downloading said subject data file from said client computer, and downloading said application corresponding to said subject data file from said client computer by checking a header of said subject data file.

6. The printer of claim 1, wherein said network computer has means for, upon receipt of the print command from said client computer connected to said computer network, downloading said subject data file from said client computer, and downloading said application corresponding to said subject data file from an application server connected to said computer network by checking a header of said subject data file.

7. The printer of claim 1, wherein said network computer has means for, upon receipt of the print command from said client computer connected to said computer network, downloading said subject data file from a file server connected to said computer network, and downloading said application corresponding to said subject data file from an application server connected to said computer network by checking a header of said subject data file.

8. The printer of claim 1, wherein said application is a Java® applet.

9. The printer of claim 8, wherein said image converting means includes:

a Java OS1® for running the Java® applet; and a raster image processor for converting said subject data file opened by the Java® applet to a raster image on the Java OS®.

10. The printer of claim 1, wherein said network computer has means for, upon receipt of the print command from said client computer connected to said computer network, downloading said subject data file from said client computer, and downloading said application corresponding to said subject data file from said client computer by checking application information in said subject data file.

11. The printer of claim 1, wherein said network computer has means for, upon receipt of the print command from said client computer connected to said computer network, downloading said subject data file from said client computer, and downloading said application corresponding to said subject data file from an application server connected to said computer network by checking application information in said subject data file.

12. The printer of claim 1, wherein said network computer has means for, upon receipt of the print command from said client computer connected to said computer network, downloading said subject data file from a file server connected to said computer network, and downloading said application corresponding to said subject data file from an application server connected to said computer network by checking application information in said subject data file.

13. A computer network system comprising:

a printer;

a plurality of apparatuses including a computer, said printer being connected to the plurality of apparatuses;

wherein said printer comprises:

a network computer enclosed in said printer; and wherein said network computer includes:

network control means for downloading a subject data file to be printed out that has not been converted into a raster image, and an application corresponding to said subject data file from any of said plurality of apparatuses on said computer network system based on a print command issued by a client computer on said network system;

specifying means for specifying said application corresponding to said subject data file by checking application information in said subject data file;

image converting means for starting up said application and converting said subject data file into the raster image; and wherein after said application corresponding to said subject data file is specified by said specifying means, said network control means downloads said application as specified by said specifying means from said computer network.

14. The computer network system of claim 13, wherein:

said plurality of apparatuses further include said client computer; and said network control means downloads said subject data file and said application from said client computer.

15. The computer network system of claim 13, wherein:

said plurality of apparatuses further include said client computer and an application server; and said network control means downloads said subject data file and said application from said client computer and said application server, respectively.

16. The computer network system of claim 13, wherein:

said plurality of apparatuses further include said client computer, an application server, and a file server; and said network control means downloads, at the print command issued by said client computer, said subject data file and said application from said file server and said application server, respectively.

17. The computer network system of claim 13, wherein said application is a Java® applet.

18. A printing method carried out by a printer connected to a computer network, comprising the steps of:

downloading to the printer a subject data file to be printed out that has not been converted into a raster image, and an application corresponding to said data file from said computer network based on a print command issued by a client computer connected to said computer network;

wherein said downloading includes the steps of (i) checking application information in said subject data file for specifying said application corresponding to said subject data file and (ii) downloading said application as specified from said computer network after carrying out said step (i); and starting up said application downloaded, and converting said data file to a raster image.

19. A computer-readable recording medium having recorded thereon a program to direct a computer to carry out a printing method including the steps of:

downloading to a printer a subject data file to be printed out that has not been converted into a raster image, and an application corresponding to the data file from a computer network based on a print command issued by a client computer connected to the computer network;

wherein said downloading includes the steps of (i) checking application information in the subject data file for specifying the application corresponding to the subject data file and (ii) downloading the application as specified from the computer network after carrying out said step (i); and starting up the application downloaded, and converting the data file to a raster image.

* * * * *